S. MILLS.

Seed-Planter.

No 18,856. Patented Dec 15. 1857.

UNITED STATES PATENT OFFICE.

SAMUEL MILLS, OF NEW CASTLE, OHIO.

IMPROVEMENT IN SEEDING-MACHINES.

Specification forming part of Letters Patent No. 18,856, dated December 15, 1857.

*To all whom it may concern:*

Be it known that I, SAMUEL MILLS, of New Castle, in the county of Coshocton and State of Ohio, have invented a new and useful Improvement in Seeding-Machines; and I do hereby declare that the following is a full, clear, and exact description of the same, reference being had to the annexed drawings, making a part of this specification, in which—

Figure 1:
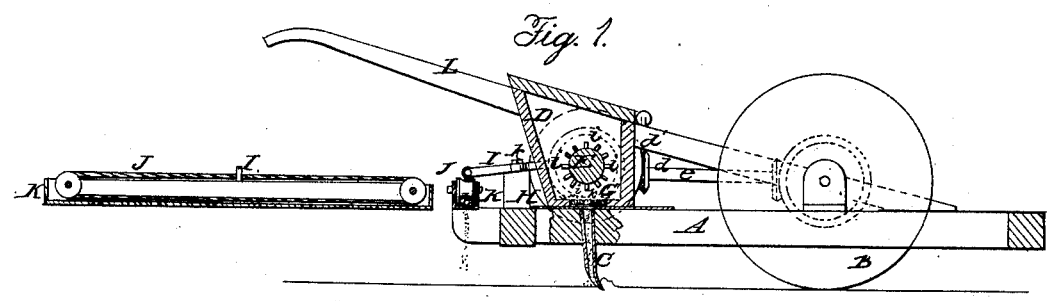
Figure 2:
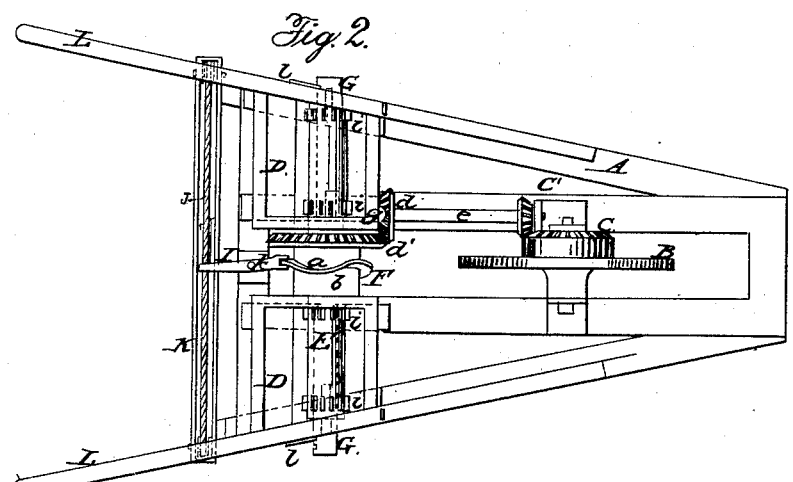
Figure 3:
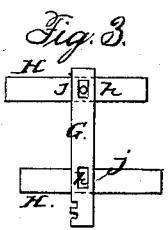

Figure 1 is a central longitudinal vertical section of my improvement. Fig. 2 is a plan or top view of the same. Fig. 3 is a central longitudinal vertical section of the broadcast-distributing device. Fig. 4 is a detached plan of three of the slides.

Similar letters of reference indicate corresponding parts in the several figures.

This invention consists in the employment or use of two distributing devices, peculiarly arranged and combined so as to operate simultaneously and plant seed in hills or drills, and also sow grain broadcast at the same time.

To enable those skilled in the art to fully understand and construct my invention, I will proceed to describe it.

A represents a horizontal frame, the front end of which is supported by a wheel, B, the back part being supported by the seed-conveying tubes C. (See Fig. 1.) The frame A is of taper form, its front end being narrower than its back end. (See Fig. 2.)

On the back part of the frame A two seed-boxes, D D, are placed, and a shaft, E, passes longitudinally through them. This shaft has a cam, F, upon it at its center, said cam being between the two boxes D D, and formed by having a zigzag flange, $a$, placed on the periphery of a hub, $b$. The shaft E is rotated from the wheel B by means of gearing $c$ $c'$ $d$ $d'$, the shaft $e$ having its back bearing in an adjustable bar, $g$, by moving which the pinion $d$ on said shaft may be thrown in and out of gear with the pinion $d'$ on the shaft E. The bottoms of the seed-boxes D D are perforated, and a longitudinal slide, G, is fitted in each, said slides being perforated with oblong holes $h$, as shown in Fig. 4. By adjusting the slides G the discharge-orifices in the bottoms of the seed-boxes may be contracted, so as to regulate the discharge of the seed as desired.

On the shaft E there are placed radial projections $i$. These projections are placed directly over the holes $h$ in the slides G, and serve to feed or discharge the seed through them.

Underneath the bottoms of the seed-boxes D D slides H are placed. These slides are placed at right angles with the slides G G, and are perforated with holes $j$. These slides are placed so as to work directly under the holes $h$ in the slides G G, as shown in Fig. 4. The slides H are for the purpose of cutting off or closing either of the seed-discharging orifices separately or independently of the others.

The cam F operates a lever, I, giving a vibratory motion to the same. This lever has its fulcrum $k$ at the back part of the frame A, and the outer end of said lever is connected to an endless cord, J, which is fitted within a box, K, at the back part of the frame A. The box K extends the whole width of the frame A, and the cord J extends the whole length of the box K, the lower part of the cord being quite close to the bottom of the box K. (See Fig. 3.) The bottom of the box K is perforated, and the frame A is provided with handles L L.

The slides G G are retained in proper position by means of springs $l$ $l$, which are attached to the ends of the said boxes D D.

The seed to be planted in hills or drills is placed in the boxes D D, and the grain to be sown broadcast is placed in the box K. As the machine is drawn along the seed is discharged from the boxes D D by the projections $i$ on shaft E, which is rotated by the gearing previously described, the tubes C conveying the seed into the furrows, a tube being in communication or line with each discharging-orifice. The cam F and lever I give a vibratory movement to the cord J, and this cord, by its movement, serves to discharge the grain broadcast through the perforated bottom of the box K.

The device is well adapted for sowing wheat broadcast among corn, both operations being performed at the same time. It is also well adapted for sowing broadcast turnip and other small seed around corn.

I do not claim, broadly, the sowing of two different kinds of seed at the same time in different ways—that is, in drills or hills and broadcast—for this has been previously done; but,

Having thus described my invention, what I claim as new, and desire to secure by Letters Patent, is—

The rotating shaft E, provided with projections $i$, and placed within the seed-boxes D D, which are provided with slides G H, in combination with the box K, having a perforated bottom, and provided with the endless cord J, operated by the cam F and lever I, substantially as and for the purpose set forth.

SAMUEL MILLS.

Witnesses:
B. S. LEE,
ISAAC HOGANS.